United States Patent
Brenner et al.

(10) Patent No.: US 10,206,016 B1
(45) Date of Patent: Feb. 12, 2019

(54) STREAMING SMOOTHNESS INDICATOR SYSTEM

(71) Applicant: GOMACO Corporation, Ida Grove, IA (US)

(72) Inventors: Mark W. Brenner, Ida Grove, IA (US); Raymond J. Bumann, III, Ida Grove, IA (US)

(73) Assignee: Gomaco Corporation, Ida Grove, IA (US)

( * ) Notice: Subject to any disclaimer, the term of this patent is extended or adjusted under 35 U.S.C. 154(b) by 0 days.

(21) Appl. No.: 15/436,533

(22) Filed: Feb. 17, 2017

Related U.S. Application Data

(60) Provisional application No. 62/297,453, filed on Feb. 19, 2016.

(51) Int. Cl.
| | |
|---|---|
| *H04Q 9/00* | (2006.01) |
| *G01B 17/08* | (2006.01) |
| *H04L 12/40* | (2006.01) |
| *G01S 19/13* | (2010.01) |

(52) U.S. Cl.
CPC ............ *H04Q 9/00* (2013.01); *G01B 17/08* (2013.01); *G01S 19/13* (2013.01); *H04L 2012/40215* (2013.01); *H04Q 2209/43* (2013.01)

(58) Field of Classification Search
None
See application file for complete search history.

(56) References Cited

U.S. PATENT DOCUMENTS

| | | | | |
|---|---|---|---|---|
| 2,094,910 A | * | 10/1937 | Baily | E01C 19/405 404/114 |
| 3,582,637 A | * | 6/1971 | Cecil, Jr. | G02B 6/4298 362/581 |
| 5,549,412 A | * | 8/1996 | Malone | E01C 19/004 404/84.1 |
| 5,941,658 A | * | 8/1999 | Dahlinger | E01C 19/008 172/4.5 |
| 6,055,486 A | * | 4/2000 | Minnich | E01C 19/407 404/115 |
| 7,044,680 B2 | * | 5/2006 | Godbersen | E01C 23/07 404/118 |
| 7,044,681 B2 | * | 5/2006 | Quenzi | E01C 19/006 404/114 |
| 7,845,878 B1 | * | 12/2010 | Godbersen | E01C 23/07 404/72 |
| 8,371,770 B1 | * | 2/2013 | Rasmusson | E01C 19/486 404/102 |
| 8,702,344 B2 | * | 4/2014 | Hanfland | G01B 21/08 404/118 |
| 9,458,581 B1 | * | 10/2016 | Schaeding | E01C 23/01 |
| 9,624,626 B1 | * | 4/2017 | Schaeding | E01C 19/00 |
| 9,670,627 B1 | * | 6/2017 | Schaeding | E01C 19/42 |

(Continued)

*Primary Examiner* — Chico A Foxx
(74) *Attorney, Agent, or Firm* — Suiter Swantz pc llo

(57) ABSTRACT

A system for measuring a surface profile during the paving process includes a smoothness processor and a single directly connected elevation sensor to produce streaming, real-time smoothness data and a short term trend line so that the operator can make prospective corrections to paving machine settings. Real-time smoothness data is sent to a remote device. The smoothness processor may also receive additional sensor data from one CAN connected sensor and up to five sonic sensors and display the CAN connected sensor data to the operator.

17 Claims, 5 Drawing Sheets

(56) References Cited

U.S. PATENT DOCUMENTS

| | | | |
|---|---|---|---|
| 2002/0169536 A1* | 11/2002 | Feucht | B62D 11/183 701/50 |
| 2006/0285320 A1* | 12/2006 | Geyer | F04B 35/06 362/157 |
| 2007/0276568 A1* | 11/2007 | Tozu | B60N 2/0244 701/49 |
| 2008/0253834 A1* | 10/2008 | Colvard | E01C 19/006 404/84.05 |
| 2009/0103978 A1* | 4/2009 | Walker | E01C 23/01 404/72 |
| 2009/0324331 A1* | 12/2009 | Glee | E01C 19/004 404/75 |
| 2012/0301220 A1* | 11/2012 | Snoeck | E01C 23/088 404/75 |
| 2014/0186115 A1* | 7/2014 | Graham | E01C 19/4873 404/75 |
| 2016/0177517 A1* | 6/2016 | Engels | G06T 7/20 404/75 |
| 2016/0185164 A1* | 6/2016 | Thiesse | E01C 19/48 152/418 |
| 2016/0371813 A1* | 12/2016 | Fujie | B60W 50/14 |
| 2017/0121939 A1* | 5/2017 | Schaeding | E02F 9/2029 |

* cited by examiner

STREAMING SMOOTHNESS INDICATOR SYSTEM

PRIORITY

The present application claims the benefit under 35 U.S.C. § 119(e) of U.S. Provisional App. No. 62/297,453 (filed Feb. 19, 2016), which is incorporated herein by reference.

FIELD OF THE INVENTION

Embodiments of the inventive concepts disclosed herein are directed generally toward surface feature analysis.

BACKGROUND

Contractors are frequently graded on the smoothness of a finished, paved surface. It is desirable to profile the surface for determining whether modifications such as grinding are required to achieve a desired smoothness. Typically, pavement is completed and allowed to cure such that surface profile measurements may be taken to determine whether the surface meets smoothness requirements. The surface profile measurements are used to calculate index values for the road surface, such as Profile Index (PI) values and International Roughness Index (IRI) values.

After the paved surface has set up, a surface profile is taken with a profilograph, such as a California profilograph, which is wheeled along the road for creating a roughness profile of the road. Then, modifications to the road surface such as grinding may be conducted to meet specifications.

Modifications after the surface has cured are costly. It would be desirable to provide a system and method for measuring a surface profile during the paving process so that the operator can make prospective corrections to paving machine settings.

SUMMARY

In one aspect, embodiments of the inventive concepts disclosed herein are directed to a system and method for measuring a surface profile during the paving process so that the operator can make prospective corrections to paving machine settings.

In a further aspect, streaming smoothness data is sent to a remote computing device for display in real-time.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
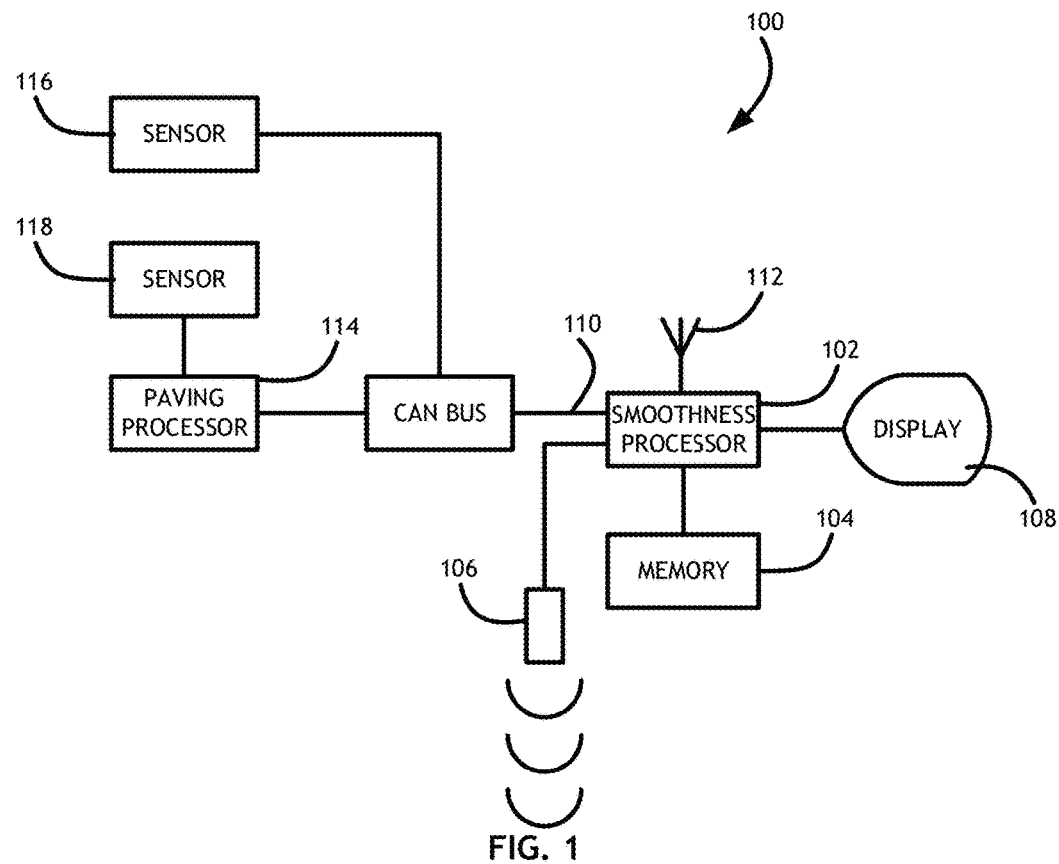
FIG. 1 shows a computer system suitable for implementing embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Finally, a better understanding of the embodiments described herein may be better understood with reference to U.S. Pat. No. 7,845,878, U.S. Pat. No. 7,850,395, and U.S. Pat. No. 8,682,622, all of which are hereby incorporated by reference.

Broadly, embodiments of the inventive concepts disclosed herein are directed to a real-time smoothness indicator system with a limited set of surface sensors.

Referring to FIG. 1, a computer system 100 suitable for implementing embodiments of the inventive concepts disclosed herein is shown. The computer system 100 includes a smoothness processor 102 connected to a memory 104 for storing smoothness processor executable code, an elevation distance sensor 106 (such as an ultrasonic sensor, laser sensor, or other non-contact sensor) for receiving data corresponding to features on a paving surface during a paving operation, and a display 108 for displaying instantaneous streaming sensor data and short term trend data, such as a 200 foot trend line, indicating a level of paving surface smoothness during the paving process.

In some embodiments, the smoothness processor 102 further includes a controller area network (CAN) interface 110 for receiving data from one or more paving machine specific sensors 116, 118 connected to the CAN, either directly via the CAN, or from an ancillary paving processor 114 that comprises a node in the CAN. The smoothness processor 102 may also comprise a node in the CAN. CAN connected sensors 116, 118 may include slope sensors included in some paving machines to maintain the slope setting of the paving machine and/or additional elevation distance sensor data. The CAN connected sensors 116, 118 provide data for making smoothness calculations, but are actually not integral to the systems embodying the present invention; rather the CAN connected sensors 116, 118 are integral to the paving system. The data produced by the CAN connected sensors 116, 118 in their ordinary functions during paving may be used in an ancillary capacity by the smoothness processor 102 when making smoothness calculations. The smoothness processor 102 may receive data from as few as one CAN connected sensor 116, 118 and up to five elevation sensors 106. Because the smoothness processor 102 is not collating data from the elevation distance sensor 106 and CAN connected sensors 116, 118, no CAN gateway node is necessary.

In some embodiments, the smoothness processor 102 is connected to one or more wireless data communication devices 112. The wireless data communication devices 112 may include a Wi-Fi adapter, a Bluetooth adaptor, cellular network adaptor, or any other telematics technology; furthermore, the wireless data communication devices 112 may include an antenna suitable for identifying a location such as a satellite positioning antenna. The smoothness processor 102 transmits streaming data and/or trend line data derived from the elevation distance sensor 106 and/or the CAN connected sensors 116, 118 by the smoothness processor 102 to a remote device such as cell phone or other remote terminal via the wireless data communication device.

In some embodiments, the paving processor 114 may receive a signal identifying a location of the paving apparatus; for example, via a satellite based positioning system or a total station position system. The smoothness processor 102 may log locations where a computed smoothness value exceeds a defined threshold.

Figure 2:
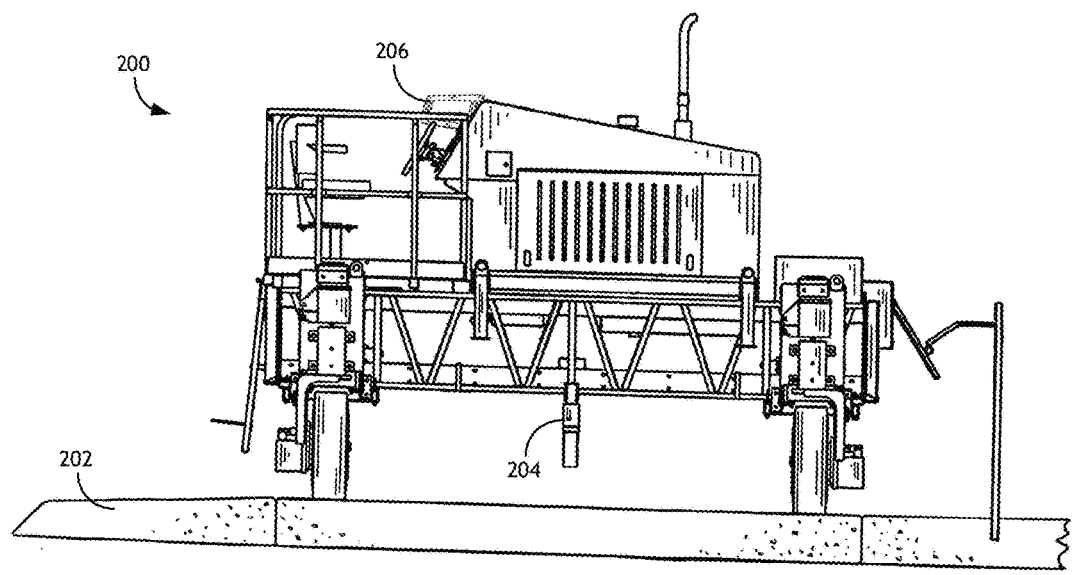
FIG. 2 shows a front environmental view of a paving apparatus including embodiments of the inventive concepts disclosed herein.

Referring to FIG. 2, a front environmental view of a paving apparatus 200 including embodiments of the inventive concepts disclosed herein is shown. The paving apparatus 200 includes a single elevation distance sensor 204 for scanning a paving surface 202 during a paving process to derive a smoothness rating. Embodiments may be used to measure a profile of a paving surface 202 such as concrete; a base course including cement treated base (CTB), lean concrete base, crushed stone, and crushed slag; a subbase, such as subgrade soil or aggregate; a subgrade upon which a subbase, a base, a base course, or pavement is constructed; and other graded surfaces including sand, rock, and gravel. Furthermore, embodiments may also be used for measuring a profile of a paving surface 202 which has not been graded.

The paving apparatus 200 may include one or more slope sensors integrated into the paving apparatus 200 for maintaining the paving apparatus 200 in a desired orientation during a paving process. Streaming data from the elevation distance sensor 204 and the one or more slope sensors are represented on a display device 206 for the paving apparatus operator. A smoothness processor receiving data from the elevation distance sensor 206 and one or more integrated slope sensors via the paving processor may produce one or more trend line representations for display on the display device 206.

In some embodiments, a smoothness processor in the paving apparatus 200 may comprise a CAN node. A paving processor configured to control the paving apparatus 200 during the paving process also comprises a CAN node where the paving processor receives data from the one or more CAN connected slope sensors to control the slope of the paving apparatus 200.

Figure 3:
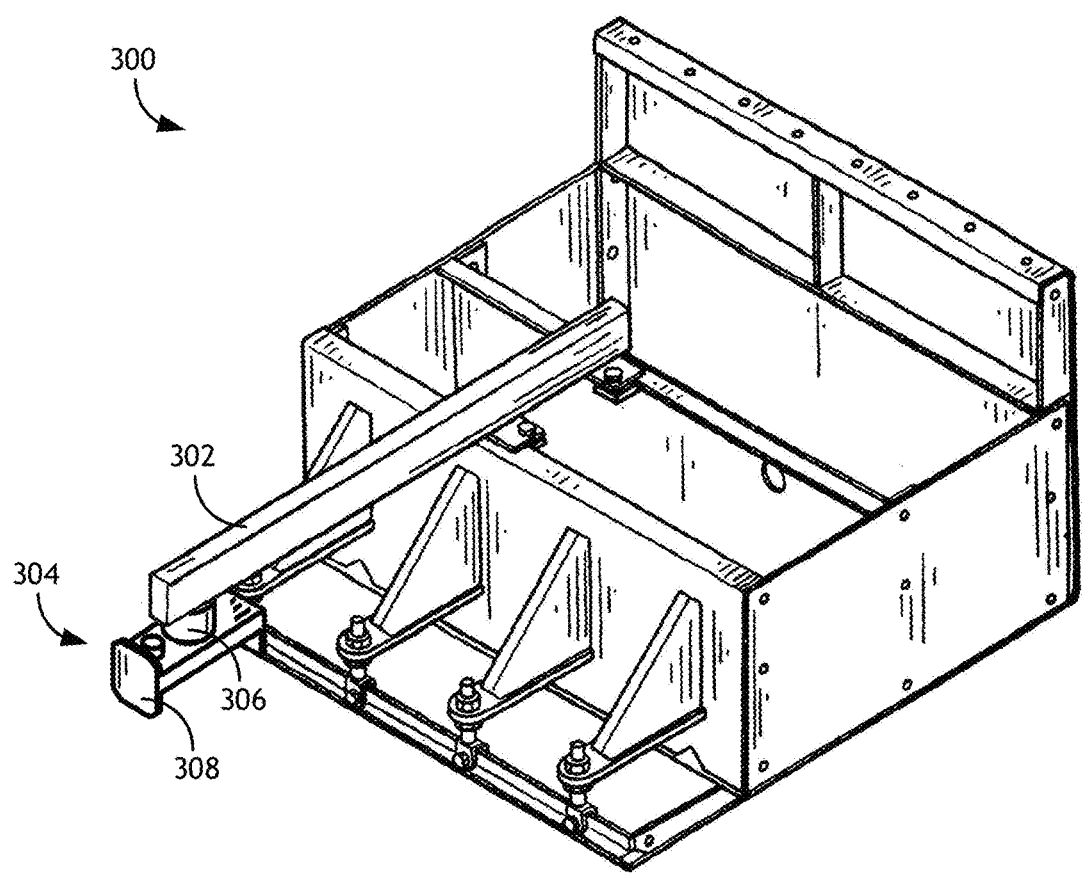
FIG. 3 shows a perspective view of a paving pan section having a cantilevered arm supporting a sensor assembly according to embodiments of the inventive concepts disclosed herein.
Figure 4:
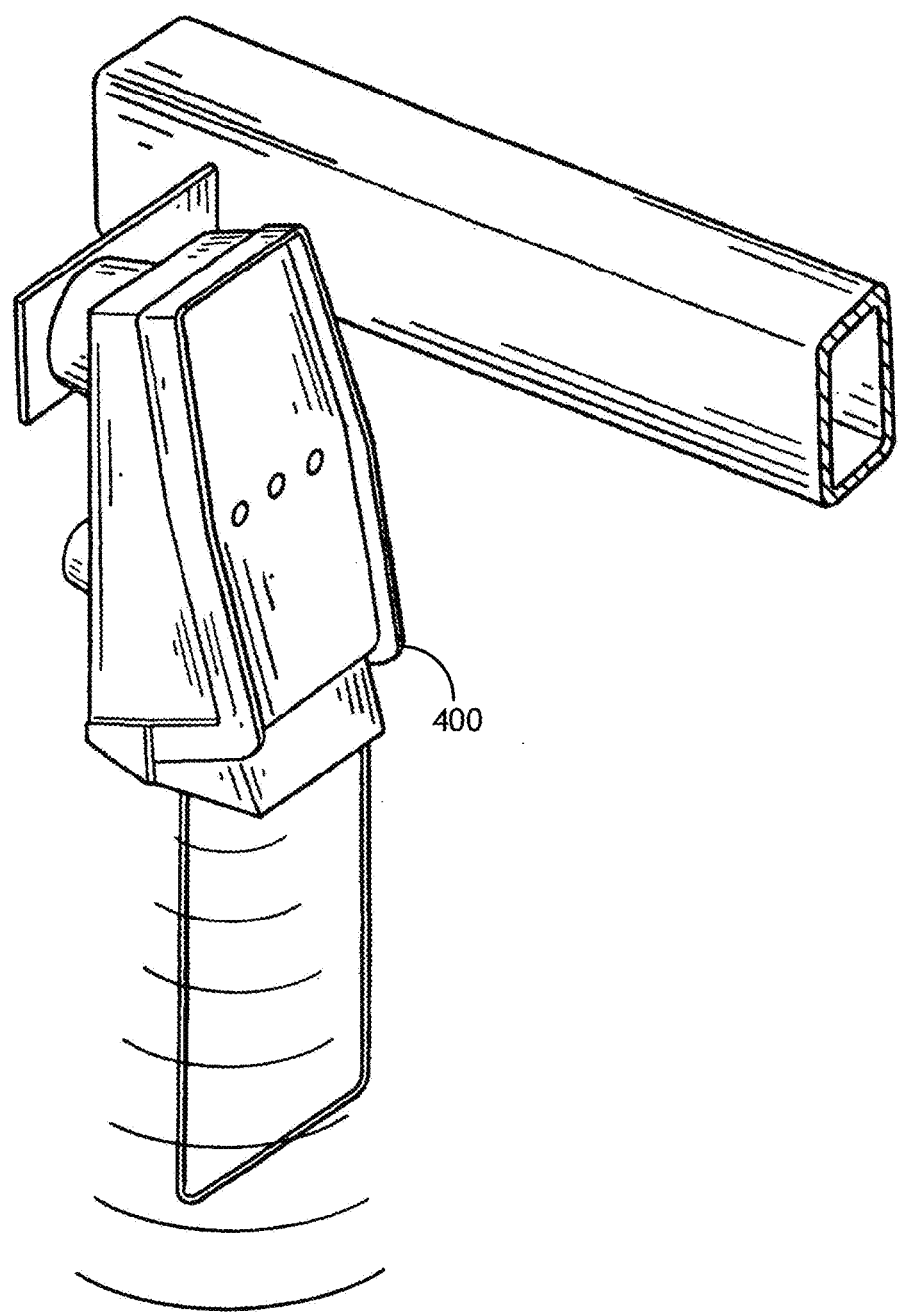
FIG. 4 shows a perspective view of a sonic sensor useful in implementing embodiments of the inventive concepts disclosed herein.

Referring to FIGS. 3 and 4, a perspective view of a paving pan section 300 having a cantilevered arm 302 supporting a sensor assembly 304 according to embodiments of the inventive concepts disclosed herein, and a sonic or ultrasonic sensor 400 are shown. The cantilevered arm 302 may be substantially centered on the paving pan section 300 or positioned so as to scan a portion of a paving surface anticipated to define a wheel track for vehicles traveling on the surface so as to maximize the relevance of any smoothness data to the actual ride quality of such vehicles.

In some embodiments, the sensor assembly 304 houses the sonic or ultrasonic sensor 400 and includes features to isolate the elevation distance sensor 400 from the paving pan section 300 and environmental interference. For example, a sensor mounting cap 306 connects the sensor assembly 304 to the cantilevered arm 302; the sensor mounting cap 306 may comprise one or more gaskets to dampen any vibrations from the paving pan section 300. Furthermore, the sensor assembly 304 may include panels 308 to define the scope of the paving surface available to the sonic or ultrasonic 400.

Figure 5:
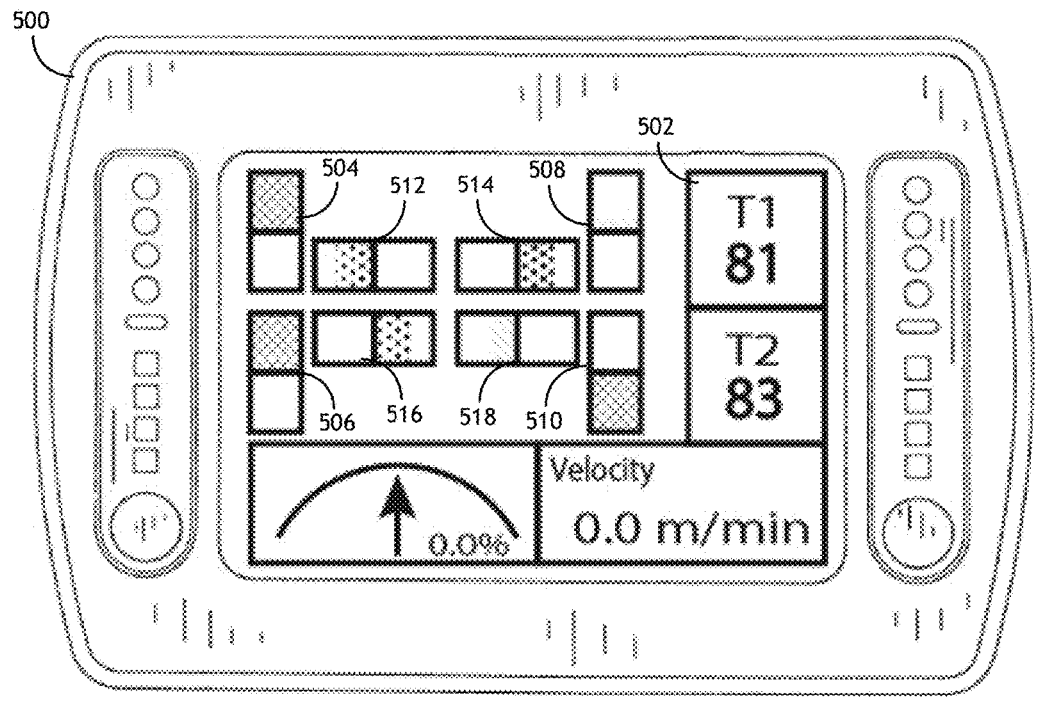
FIG. 5 shows a block diagram of a user interface with instantaneous streaming data according to embodiments of the inventive concepts disclosed herein.
Figure 6:
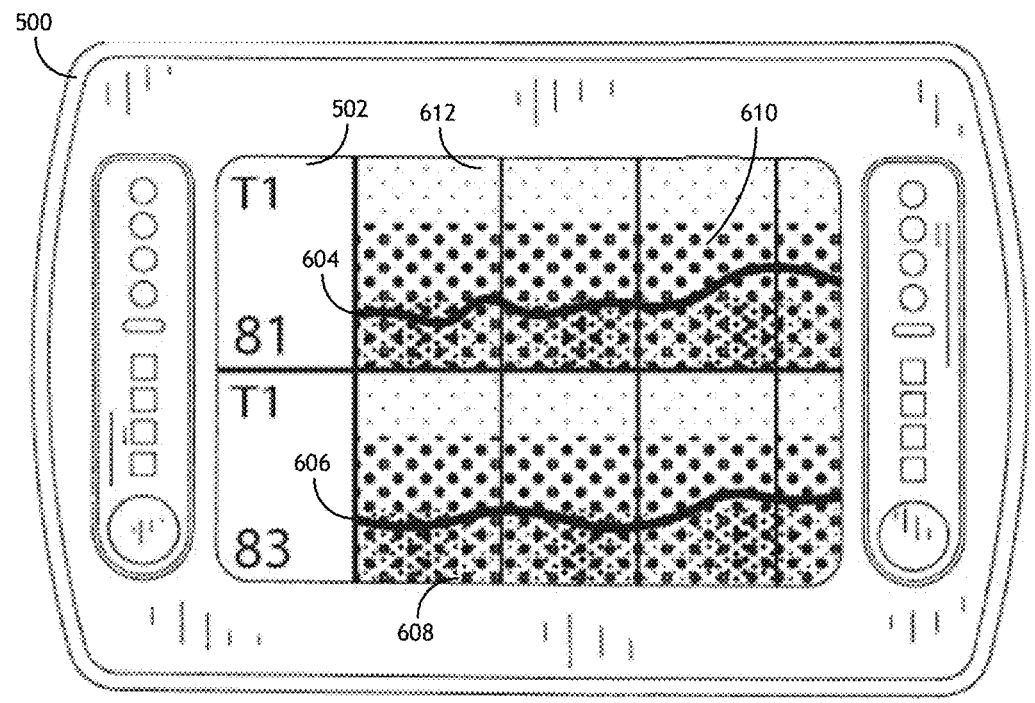
FIG. 6 shows a block diagram of a user interface with smoothness trend line data according to embodiments of the inventive concepts disclosed herein.

Referring to FIGS. 5 and 6, block diagrams of a user interface 500 with instantaneous streaming data and smoothness trend line data according to embodiments of the inventive concepts disclosed herein are shown. In some embodiments, where the user interface 500 displays instantaneous streaming data, a processor connected to the user interface 500 receives and displays smoothness data 502 from one or more elevation distance sensors orientated to scan a paving surface during a paving process. Smoothness data 502 may be represented with a visual indicator defining several smoothness value ranges. For example, a desirable smoothness range may be defined by a green color, a marginal smoothness range may be defined by a yellow color, and an undesirable smoothness range may be defined by a red color.

In some embodiments, an operator may make alterations to the paving process to improve the instantaneous smoothness indicator. In some embodiments, a dedicated smoothness processor may be a CAN node and communicate the instantaneous smoothness indicator to a paving processor, also a CAN node, configured to control a paving apparatus during a paving process. The paving processor may then adjust one or more features of the paving process to improve the instantaneous smoothness indicator.

In some embodiments, instantaneous data from one or more CAN connected slope sensors may be received via the paving processor and are also represented on the user interface 500. Slope sensor data 504, 506, 508, 510, 512, 514, 516, 518 may be represented individually without collation. Iconographic representations of the slope sensor data 504, 506, 508, 510, 512, 514, 516, 518 may be orientated for positional accuracy relative to the operator. For example, slope sensor data 504, 506, 508, 510 parallel to the direction of travel may be positioned to represent corners of the paving apparatus, in an orientation to indicate the represented slope. Furthermore, slope sensor data 512, 514, 516, 518 perpendicular to the direction of travel may be positioned to represent corners of the paving apparatus, in an orientation to indicate the represented slope. Slope sensor data 504, 506, 508, 510, 512, 514, 516, 518 may be represented with visual indicators defining several slope value ranges. For example, a desirable slope range may be defined by a green color, a marginal slope range may be defined by a yellow color, and an undesirable slope range may be defined by a red color.

In some embodiments, slope sensor data 504, 506, 508, 510, 512, 514, 516, 518 may comprise a deflection value of a height adjustment assembly associated with a corresponding wheel or tractor.

In some embodiments, trend line data 604, 606 may be computed and displayed on the user interface 500, either exclusively or in addition to instantaneous smoothness data 502. Trend line data 604, 606 may be displayed with a visual indicator defining several smoothness value ranges 608, 610, 612. For example, a desirable smoothness range 608 may be defined by a green color, a marginal smoothness range 610 may be defined by a yellow color, and an undesirable smoothness range 612 may be defined by a red color.

In some embodiments, the user interface 500 may be displayed to a paving apparatus operator. In other embodiments, or as an additional feature, the data defining the user interface 500 may be rendered remotely by transmission through a data link connection such as through Wi-Fi, Bluetooth, or cellular networks. A project manager, client, and/or certifying official may thereby monitor instantaneous smoothness data in real-time or near real-time.

Figure 7:
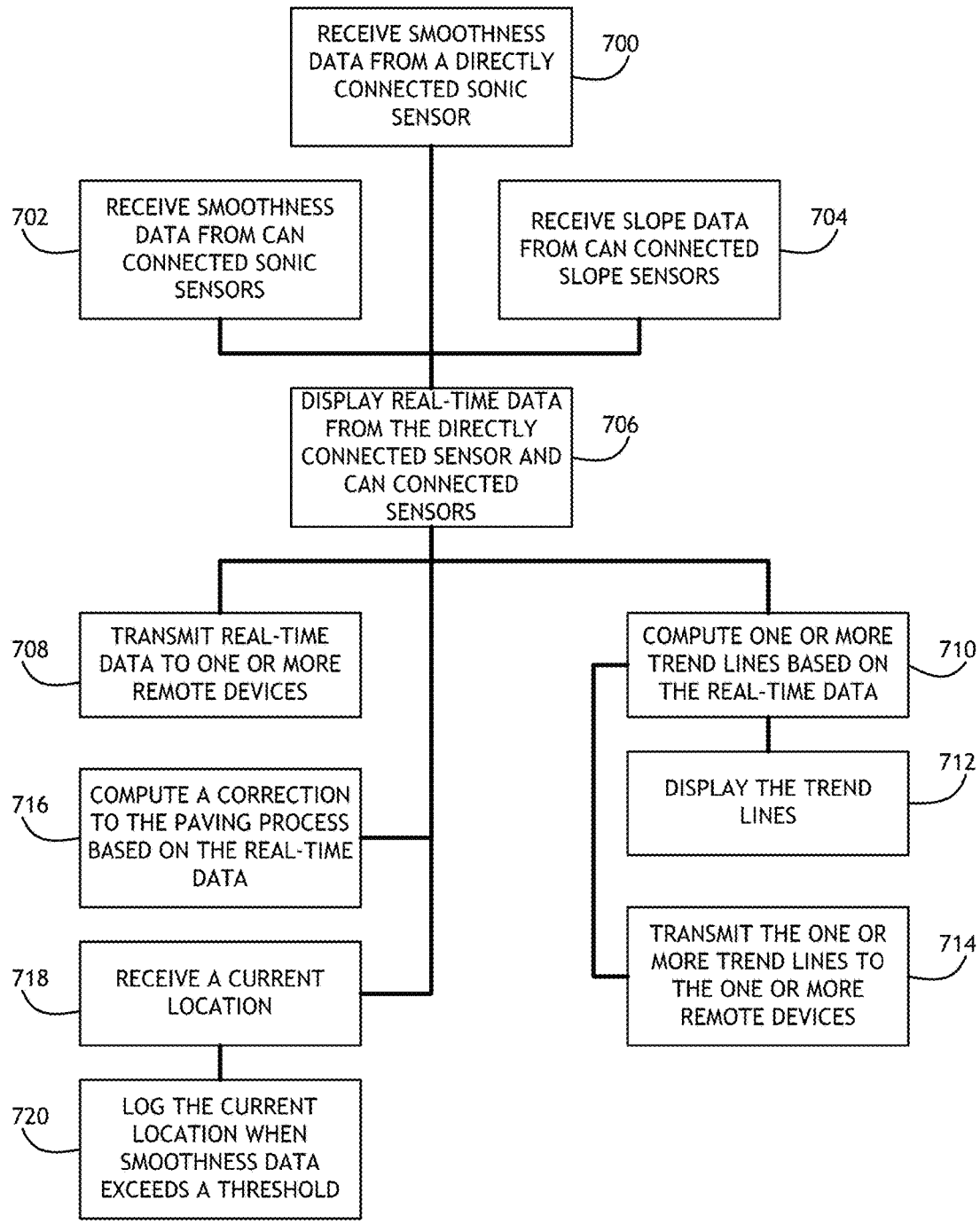
FIG. 7 shows flowchart for a method for displaying real-time smoothness data during a paving process.

Referring to FIG. 7, a flowchart for a method for displaying real-time smoothness data during a paving process is shown. A smoothness processor receives 700 data from one or more directly connected elevation distance sensors and displays 706 the real-time data on a user interface for a paving machine operator. Alternatively, the smoothness processor may receive 702 smoothness data from one or more CAN connected elevation distance sensors. The smoothness processor also receives 704 slope data from one or more CAN connected slope sensors, and displays 706 real-time data from the CAN connected sensors as well.

In some embodiments, the smoothness processor may transmit 708 real-time data from the directly connected elevation distance sensor and one or more CAN connected sensors to one or more remote devices via some form of telematics technology.

The smoothness processor may compute 710 one or more trend lines based on the real-time data and display 712 the trend lines on the user interface. The trend lines may also be transmitted 714 to the one or more remote devices.

In some embodiments, a paving processor may utilize the real-time data to compute 716 a correction to the paving process. For example, altering the operation of a screed element or adjusting the intensity of one or more vibration elements.

In some embodiments, the smoothness processor may receive 718 a current location, either directly via a satellite based positioning system or with reference to a surveyed location or the like, or via the paving processor. The smoothness processor then logs 720 the current location every time smoothness data exceeds a predefined threshold to identify portions of the paved surface requiring further attention.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages. The form herein before described being merely an explanatory embodiment thereof, it is the intention of the following claims to encompass and include such changes.

What is claimed is:

1. A computer apparatus comprising:
a dedicated smoothness processor comprising a node in a controller area network (CAN);
a memory coupled with the smoothness processor, storing processor executable code;
an elevation distance sensor comprising one of a sonic sensor or a laser sensor, for receiving data corresponding to features on a paving surface during a paving process, coupled with the smoothness processor;
wherein the elevation distance sensor is mounted to a sensor assembly mounted on a cantilever arm substantially centered on a paving pan section,
the sensor assembling comprising:
at least one gasket to dampen vibrations from the paving pan section; and
at least one panel defining a scope of the paving surface for which the elevation distance sensor receives the features on the paving surface during the paving process;
a display device connected to the smoothness processor;
a wireless data communication device connected to the smoothness processor; and
processor executable code that configures the smoothness processor to:
receive real-time data from the elevation distance sensor;
receive real-time data from one or more CAN connected slope sensors via a paving processor, the CAN connected slope sensors configured for providing slope data to the paving processor during the paving process;
display the real time data;
transmit the real-time data to a remote device via the wireless data communication device;

identify a smoothness fault based on the real-time data from the elevation distance sensor and the one or more CAN connected slope sensors; and
calculate an alteration to at least one of an operation of a screed element and an intensity of one or more vibration elements during the paving process.

2. The computer apparatus of claim 1, wherein the processor executable code further configures the smoothness processor to:
display the real-time data from the one or more CAN connected slope sensors.

3. The computer apparatus of claim 2, wherein the processor executable code further configures the smoothness processor to transmit the real-time data from the one or more CAN connected slope sensors to a remote device via the wireless data communication device.

4. The computer apparatus of claim 2, wherein the processor executable code further configures the smoothness processor to:
compute one or more short term trend lines based on the real-time data from the elevation distance sensor and the CAN connected slope sensors;
display the one or more trend lines; and
transmit the one or more trend lines to the remote device via the wireless data communication device.

5. The computer apparatus of claim 1, wherein the processor executable code further configures the smoothness processor to:
compute one or more short term trend lines based on the real-time data from the elevation distance sensor;
display the one or more trend lines; and
transmit the one or more trend lines to the remote device via the wireless data communication device.

6. The computer apparatus of claim 1, wherein the processor executable code further configures the smoothness processor to:
receive a current location; and
log the current location when the real-time data from the elevation distance sensor exceeds a predefined value.

7. A paving machine comprising:
a dedicated smoothness processor comprising a node in a controller area network (CAN);
a memory coupled with the smoothness processor, storing processor executable code;
an elevation distance sensor comprising one of a sonic sensor or a laser sensor, for receiving data corresponding to features on a paving surface during a paving process, coupled with the smoothness processor;
wherein the elevation distance sensor is mounted to a sensor assembly mounted on a cantilever arm substantially centered on a paving pan section,
the sensor assembling comprising;
at least one gasket to dampen vibrations from the paving pan section; and
at least one panel defining a scope of the paving surface for which the elevation distance sensor receives the features on the paving surface during the paving process;
a display device connected to the smoothness processor;
a wireless data communication device connected to the smoothness processor; and
processor executable code that configures the smoothness processor to:
receive real-time data from the elevation distance sensor;
receive real-time data from one or more CAN connected slope sensors via a paving processor, the CAN connected slope sensors configured for providing slope data to the paving processor during the paving process;
display the real time data;
transmit the real-time data to a remote device via the wireless data communication device;
identify a smoothness fault based on the real-time data from the elevation distance sensor and the one or more CAN connected slope sensors; and
calculate an alteration to at least one of an operation of a screed element and an intensity of one or more vibration elements during the paving process.

8. The paving machine of claim 7, wherein the processor executable code further configures the smoothness processor to:
display the real-time data from the one or more CAN connected slope sensors.

9. The paving machine of claim 8, wherein the processor executable code further configures the smoothness processor to transmit the real-time data from the one or more CAN connected slope sensors to a remote device via the wireless data communication device.

10. The paving machine of claim 9, wherein the processor executable code further configures the smoothness processor to:
compute one or more short term trend lines based on the real-time data from the elevation distance sensor and the CAN connected slope sensors;
display the one or more trend lines; and
transmit the one or more trend lines to the remote device via the wireless data communication device.

11. The paving machine of claim 7, wherein the processor executable code further configures the smoothness processor to:
compute one or more short term trend lines based on the real-time data from the elevation distance sensor;
display the one or more trend lines; and
transmit the one or more trend lines to the remote device via the wireless data communication device.

12. The paving machine of claim 7,
wherein the cantilever arm is disposed to place the elevation distance sensor over an expected tire track location during a paving process.

13. A method for providing real-time smoothness data to a paving machine operator, comprising:
receiving real-time data corresponding to features on a paving surface during a paving process, from an elevation distance sensor comprising one of a sonic sensor or a laser sensor, the elevation distance sensor disposed in a sensor assembly mounted on a cantilever arm substantially centered on a paving pan section,
the sensor assembling comprising:
at least one gasket to dampen vibrations from the paving pan section; and
at least one panel defining the scope that paving surface for which the elevation distance sensor receives the features on the paving surface during the paving process;
receiving real-time data from one or more CAN connected slope sensors via a paving processor, the CAN connected slope sensors configured for providing slope data to the paving processor during the paving process;
displaying the real time data;
transmitting the real-time data to a remote device via a wireless data communication device;

identifying a smoothness fault based on the real-time data from the elevation distance sensor and the one or more CAN connected slope sensors; and calculating an alteration to at least one of an operation of a screed element and an intensity of one or more vibration elements during the paving process.

14. The method of claim 13, further comprising:

displaying the real-time data from the one or more CAN connected slope sensors.

15. The method of claim 14, further comprising transmitting the real-time data from the one or more CAN connected slope sensors to a remote device via the wireless data communication device.

16. The method of claim 15, further comprising:

computing one or more short term trend lines based on the real-time data from the elevation distance sensor and the CAN connected slope sensors;

displaying the one or more trend lines; and transmitting the one or more trend lines to the remote device via the wireless data communication device.

17. The method of claim 13, further comprising:

receiving a current location; and logging the current location when the real-time data from the elevation distance sensor exceeds a predefined value.

* * * * *